(12) United States Patent
Shaffer et al.

(10) Patent No.: US 12,379,391 B1
(45) Date of Patent: Aug. 5, 2025

(54) LARGE MASS MEMS RESONANT BEAM ACCELEROMETER

(71) Applicant: National Technology & Engineering Solutions of Sandia, LLC, Albuquerque, NM (US)

(72) Inventors: Ryan Austin Shaffer, Albuquerque, NM (US); Brian D. Homeijer, Albuquerque, NM (US); Paul J. Resnick, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 532 days.

(21) Appl. No.: 17/988,022

(22) Filed: Nov. 16, 2022

Related U.S. Application Data

(60) Provisional application No. 63/284,674, filed on Dec. 1, 2021.

(51) Int. Cl.
*G01P 15/12* (2006.01)
*G01P 15/097* (2006.01)

(52) U.S. Cl.
CPC ............ *G01P 15/097* (2013.01); *G01P 15/12* (2013.01)

(58) Field of Classification Search
CPC .............................. G01P 15/097; G01P 15/12
See application file for complete search history.

(56) References Cited

U.S. PATENT DOCUMENTS

| | | | |
|---|---|---|---|
| 9,354,246 B2 * | 5/2016 | Simoni | G01P 15/10 |
| 2017/0108336 A1 * | 4/2017 | Boysel | G01C 19/5712 |
| 2020/0025790 A1 * | 1/2020 | Reinke | G01P 15/032 |

OTHER PUBLICATIONS

Comi, C. et al., "A new two-beam differential resonant micro accelerometer," IEEE Sensors 2009 Conference, Oct. 25-28, Christchurch, New Zealand, pp. 158-163.

* cited by examiner

*Primary Examiner* — Xin Y Zhong
(74) *Attorney, Agent, or Firm* — Mark A. Dodd

(57) ABSTRACT

A resonant beam accelerometer employing a pair of double ended tuning forks and a proof mass having meso-scale mass as it is formed in the handle layer of a SOI wafer and a method of fabricating same is disclosed. The resonant frequencies of the pair of double ended tuning forks change in opposite directions when an externally applied acceleration is in a direction parallel to the pair of double ended tuning forks. Due to the proof mass having meso-scale mass, the resonant beam accelerometer is very sensitive. By employing a lid and a stator cap, the active portions of the resonant beam accelerometer may be sealed in a vacuum to further increase sensitivity.

17 Claims, 10 Drawing Sheets

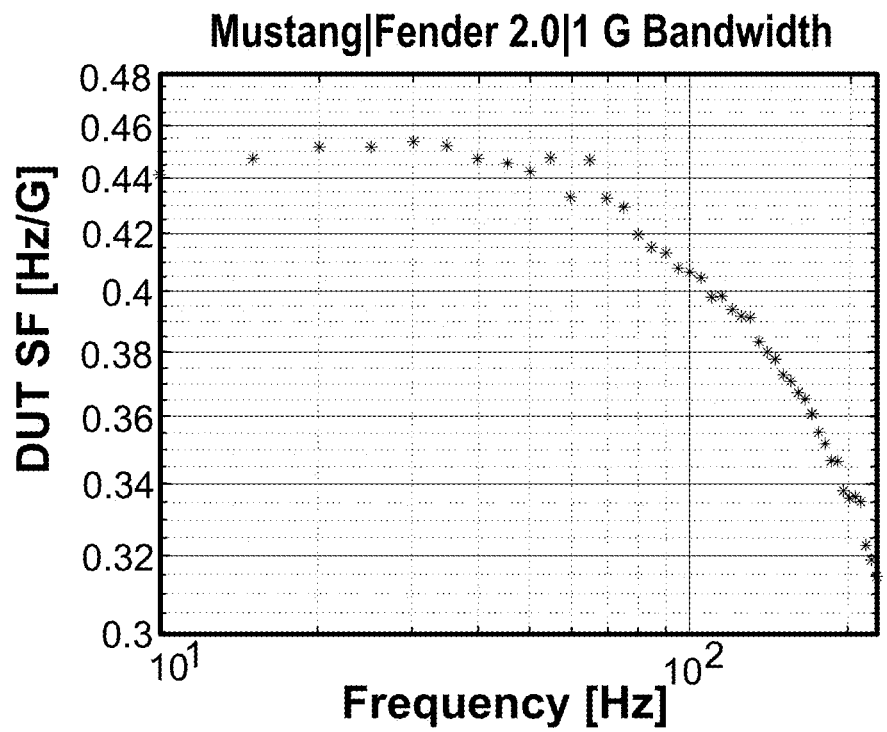
FIG. 12
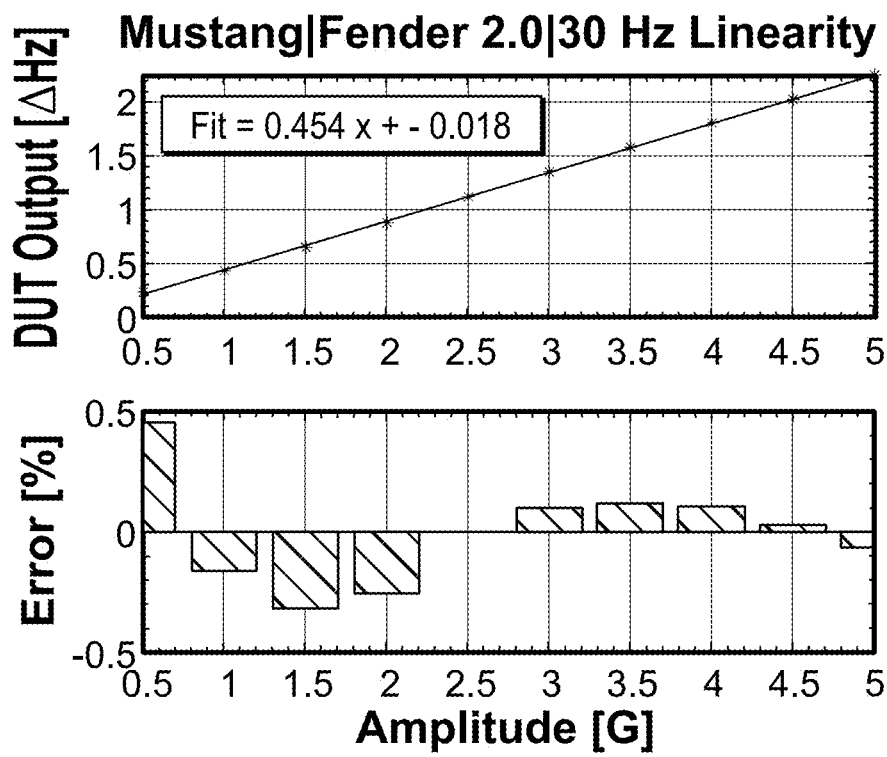
FIG. 13A
FIG. 13B

LARGE MASS MEMS RESONANT BEAM ACCELEROMETER

RELATED APPLICATIONS

This application claims priority to U.S. Provisional Application No. 63/284,674, filed on Dec. 1, 2021, and entitled LARGE MASS MEMS RESONANT BEAM ACCELEROMETER, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to a resonant beam accelerometer with a pair of microelectromechanical system (MEMS) double ended tuning forks and a proof mass formed of the handle layer of a silicon-on-insulator (SOI) wafer resulting in a large proof mass and improved sensitivity.

BACKGROUND

A resonant beam accelerometer, also known as a vibrating beam or vibratory accelerometer, is a type of frequency modulated inertial sensor that converts an acceleration vector into a measurable shift in the resonant frequency of a mechanical system. The working principal is that the resonant frequency of a member, such as a string or a beam, is a function of its tensile stress. An example is a guitar string, which can be tuned to a specific tone by adjusting the amount of tension applied to it. If instead of a tensioner, a body of mass were attached to one end of the string, then its tone, or resonant frequency, would become a function of the inertial loading of the mass by an externally applied acceleration. In this scenario, if the string could be continuously excited at its resonant frequency, and a means of monitoring and quantifying that frequency could be implemented, one would have created a resonant beam accelerometer.

Resonant beam accelerometers have been a realized technology for many decades, with efforts focusing on reducing the size, weight, power consumption, and cost of a unit while maintaining navigation—to strategic-grade performance specifications. To accomplish these potentially contradicting requirements, photolithography became the preferred method of fabrication due to its extreme precision at micron scales and the ability to batch produce devices. Initial designs leveraged quartz as the base material, which while successful in producing functional devices, were not able to meet performance requirements. As semiconductor fabrication technology improved, doped silicon became the device material of choice for its excellent electrical and mechanical properties, which improved both the manufacturability and performance of these devices. However, because quartz typically remained the substrate, material property mismatches resulted in disqualifying drift coefficients.

More recently, silicon-on-insulator (SOI) wafers have become readily available, where both the handle and the device layer are made of single crystal silicon. The handle and device layer can be degenerately doped to provide excellent properties for electromechanical systems as well as a low coefficient of thermal expansion (CTE) mismatch between layers. For these reasons, SOI wafers have become a popular platform for microelectromechanical systems (MEMS), including inertial sensors such as resonant beam accelerometers. However, most of these devices only utilize the relatively thin device layer of the SOI wafer to define their sensing features, often thinning the substrate to reduce the mechanical envelope of the product. By only utilizing the device layer, the designer must navigate tradeoffs between several device parameters. For example, to achieve a large dynamic range, a low thermal mechanical noise floor is often required, necessitating either a large mass or a vacuum. Tight vacuum requirements can increase complexity and decrease lifetime, and a large mass for a thin device layer means a high device aspect ratio, which increases cross axis sensitivity and decreases reliability. Inversely, if the device footprint were to shrink to promote reliability and cross axis rejection, critical features such as flexures would have to become thinner to maintain sensitivity. Thinner flexures can increase thermal sensitivities and fragility while decreasing bias stabilities. One could alternatively employ a design on a thick silicon wafer rather than an SOI platform. While the proof mass of the thick silicon wafer design would increase, defining their critical features in the bulk silicon faces limitations and variability in deep silicon etching that can result in degradation and limitation in device performance.

Thus, the need exists for devices with large proof masses for greater sensitivity without the penalty of a limiting and variable fabrication process.

SUMMARY

One aspect of the present invention relates to a resonant beam accelerometer employing a pair of double ended tuning forks and a proof mass having meso-scale mass as it is formed in the handle layer of a SOI wafer. The resonant frequencies of the pair of double ended tuning forks change in opposite directions when an externally applied acceleration is in a direction parallel to the pair of double ended tuning forks. Due to the proof mass having meso-scale mass, the resonant beam accelerometer has a greater sensitivity than prior art resonant beam accelerometers. By employing a lid and a stator cap, the active portions of the resonant beam accelerometer may be sealed in a vacuum to further increase performance.

In at least one embodiment of the invention, a resonant beam accelerometer comprises a central anchor column (the central anchor column formed of a handle layer and a device layer), a proof mass (the proof mass formed of the handle layer, the proof mass located around the central anchor column), first and second resonant beam structures (the first and second resonant beam structures formed of the device layer, the first and second resonant beam structures located along an acceleration measurement axis, the acceleration measurement axis perpendicular to the central anchor column, the first and second resonant beam structures mechanically coupled between the central axis column and the proof mass, each of the first and second resonant beam structures resonating at respective first and second resonant frequencies, the first and second resonant frequencies being a function of an externally applied acceleration in a direction parallel to the acceleration measurement axis), a plurality of proof mass flexures (the plurality of proof mass flexures formed of the handle layer, each of the plurality of proof mass flexures mechanically coupled between the central axis column and the proof mass, the plurality of proof mass flexures permitting motion of the proof mass along the acceleration measurement axis with respect to the central anchor column), first and second drivers (the first and second drivers formed of the device layer, the first and second drivers causing respective ones of the first and second resonant beam structures to resonate at respective first and second resonant frequencies), and first and second sensors (the first and second sensors formed of the device layer, the first and second sensors sensing changes in respective first and second resonant frequencies).

In various embodiments, the handle layer includes silicon and has a thickness between approximately 500 µm and 1 mm; the device layer includes silicon and has a thickness between approximately 10 µm and 100 µm; each side of the proof mass has a length between approximately 2 mm and 25 mm; the first and second resonant beam structures include respective first and second double ended tuning forks (the first and second double ended tuning forks include respective first and second pairs of arms); and a width of each of the first and second pairs of arms is between approximately 1 µm and 30 µm and a length of each of the first and second pairs of arms is between approximately 400 µm and 4 mm.

In other embodiments, each of the first and second resonant frequencies is between approximately 1 kHz and 100 kHz; each of the plurality of the proof mass flexures includes a respective plurality of flexure arms; a width of each of the plurality of flexure arms is between approximately 15 µm and 200 µm and a length of each of the plurality flexure arms is between approximately 500 µm and 6 mm; each of the first and second drivers includes a respective pair of comb drivers; and each of the first and second sensors includes a respective pair of comb sensors (each of the first and second sensors sensing a respective frequency change in capacitance).

In still other embodiments, the resonant beam accelerometer further comprises a frame (the frame formed of the handle layer and the device layer, the frame located around a periphery of the proof mass); the frame has a width between approximately 100 µm and 1 mm; the resonant beam accelerometer further comprises a stator plate (the stator plate formed of a second handle layer, the stator plate includes a stator central mesa and a stator frame, the stator central mesa bonded to a bottom point of the central anchor column, and the stator frame bonded to the frame); the resonant beam accelerometer further comprises a lid (the lid formed of a third handle layer, the lid including a cap central mesa and a cap frame, the cap central mesa bonded to a top point of the central anchor column, and the cap frame bonded to the frame); the lid further includes a plurality of contacts (each of the plurality of contacts in electrical contact with a corresponding one of the first and second drivers and the first and second sensors), a plurality of traces (each of the plurality of traces in electrical contact with a corresponding one of the plurality of contacts), and a plurality of bond pads (each of the plurality of bonds pads in electrical contact with a corresponding one of the plurality of traces); and the resonant beam accelerometer further comprises a stator plate (the stator plate formed of a second handle layer, the stator plate including a stator central mesa and a stator frame, the stator central mesa bonded to a bottom point of the central anchor column, and the stator frame bonded to the frame) and a lid (the lid formed of a third handle layer, the lid including a cap central mesa and a cap frame, the cap central mesa bonded to a top point of the central anchor column, and the cap frame bonded to the frame).

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIG. 12 illustrates the frequency response of a single double ended tuning fork that may be employed as part of a resonant beam accelerometer in accordance with one or more embodiments of the present invention.

FIGS. 13A and 13B illustrate the linearity and nonlinearity as a percent, respectively, of a single double ended tuning fork that may be employed as part of a resonant beam accelerometer in accordance with one or more embodiments of the present invention.

DETAILED DESCRIPTION

Exemplary Resonant Beam Accelerometer

Figure 1:
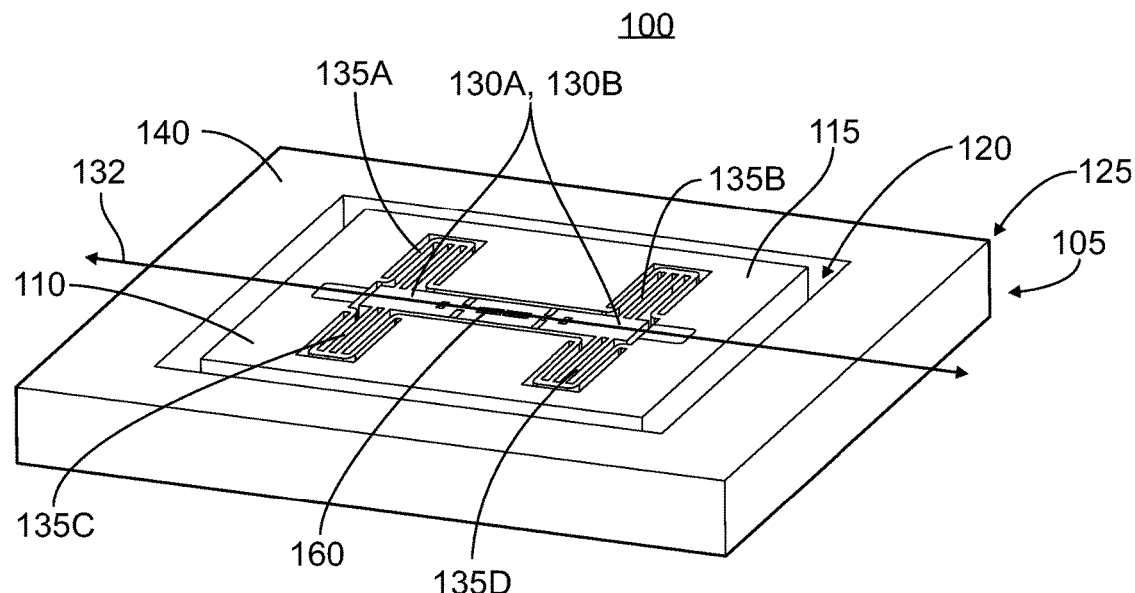
FIG. 1 illustrates a top three-dimensional view of the micro-electro-mechanical system portion of a resonant beam accelerometer in accordance with one or more embodiments of the present invention.
Figure 2:
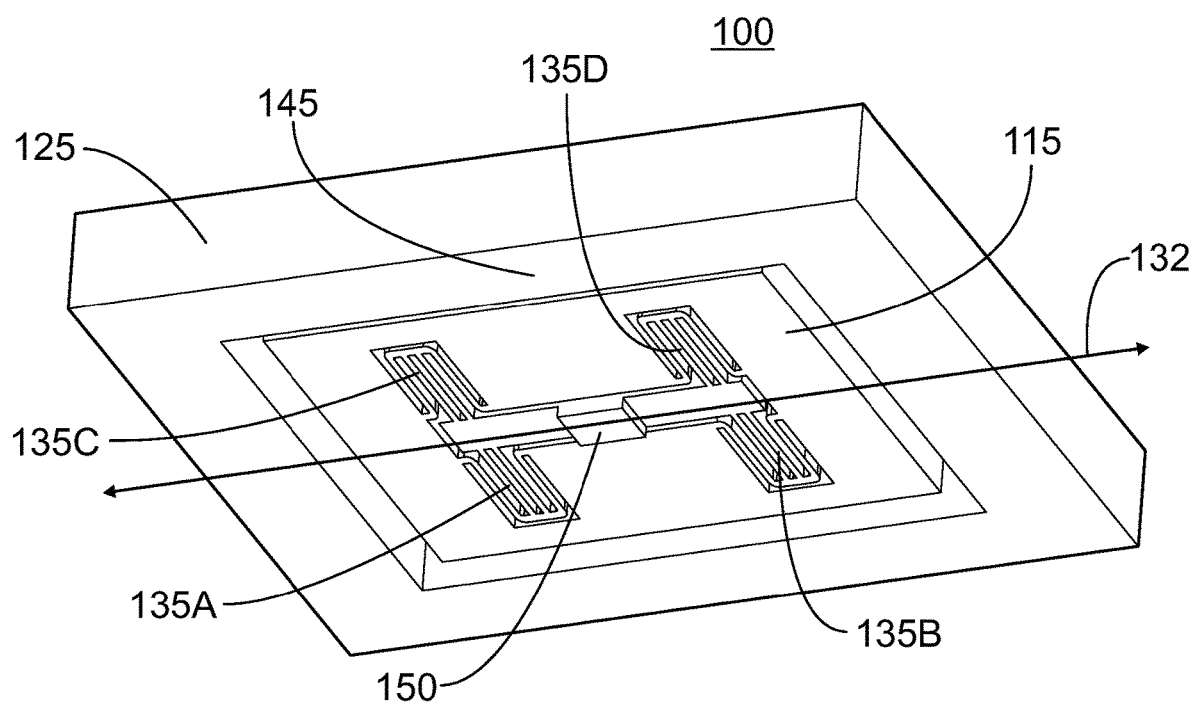
FIG. 2 illustrates a bottom three-dimensional view of the micro-electro-mechanical system portion of a resonant beam accelerometer in accordance with one or more embodiments of the present invention.

FIG. 1 illustrates a top three-dimensional view of the micro-electro-mechanical system (MEMS) portion of a resonant beam accelerometer (RBA) 100 in accordance with one or more embodiments of the present invention. The MEMS portion of the RBA 100 includes a handle 105 and a device layer 110 on the handle 105. The handle 105 and the device layer 110 may be formed, for example, from a silicon-on-insulator (SOI) wafer. A proof mass 115 is formed of the handle 105 and the device layer 110 by etching a trench 120 through the handle 105 and the device layer 110. A frame 125 is formed around the outer perimeter of the trench 120 and is formed of both the handle 105 and the device layer 110. The MEMS portion of the RBA 100 includes a pair of resonant beam structures 130A, 130B along an acceleration measurement axis 132. The MEMS portion of the RBA 100 also includes four proof mass flexures 135A-135D, with each proof mass flexure 135A-135D including a plurality of individual flexure arms (five in the embodiment illustrated in FIGS. 1 and 2). A bondable top metal layer 140 is formed on the surface of the frame 125 and forms a seal around the MEMS portion of the RBA 100 when the overall RBA device is vacuum packaged. FIG. 2 illustrates a bottom three-dimensional view of the MEMS portion of the RBA 100. The MEMS portion of the RBA 100 includes a bondable bottom metal layer 145 formed on the back-side surface of the frame 125. The MEMS portion of the RBA 100 also includes a back-side central anchor point 150 that includes a corresponding back-side central anchor point metal layer formed thereon.

Because the proof mass 115 is defined in the handle 105, it provides meso-scale mass properties and exceptional cross axis rejection due to the four proof mass flexures 135A-135D also being the full thickness of the handle 105. The large mass of the proof mass 115 reduces the thermal mechanical noise floor of the RBA device while increasing the sensitivity of the RBA device. The rigid cross axis mechanics ensure that the inertial load imparted on the pair of resonant beam structures 130A, 130B is virtually one dimensional and parallel to the direction of the pair of resonant beam structures 130A, 130B.

The back-side central anchor point 150 is slightly proud of the rest of the proof mass 115 and acts as a central anchoring point for the MEMS portion of the RBA 100. By employing the back-side central anchor point 150, both the resonant beam structures 130A, 130B (formed in the device layer) and the proof mass flexures 135A-135D (formed in the handle 105) can be designed such that they can expand and contract freely under transient thermal conditions. This approach also alleviates anchor stresses in the resonant beam structures 130A, 130B and the proof mass flexures 135A-135D. Thus, this design reduces sensor thermal coefficients, as well as sensitivities to package stresses.

Figure 3A:
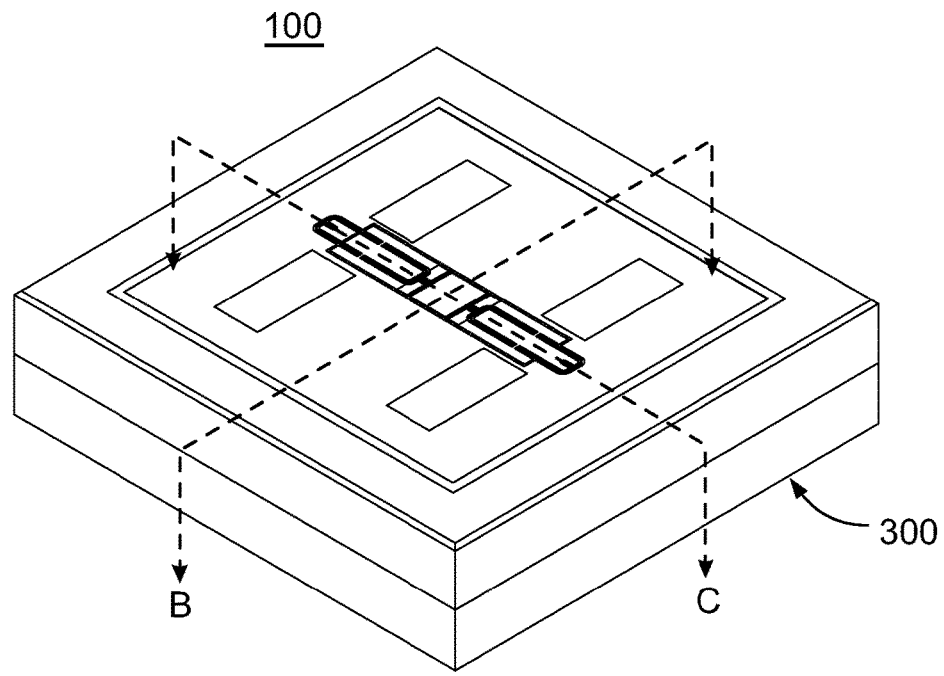
FIGS. 3A-3C illustrate various three-dimensional cross-sectional views of the micro-electro-mechanical system and stator plate of a resonant beam accelerometer in accordance with one or more embodiments of the present invention.
Figure 3B:
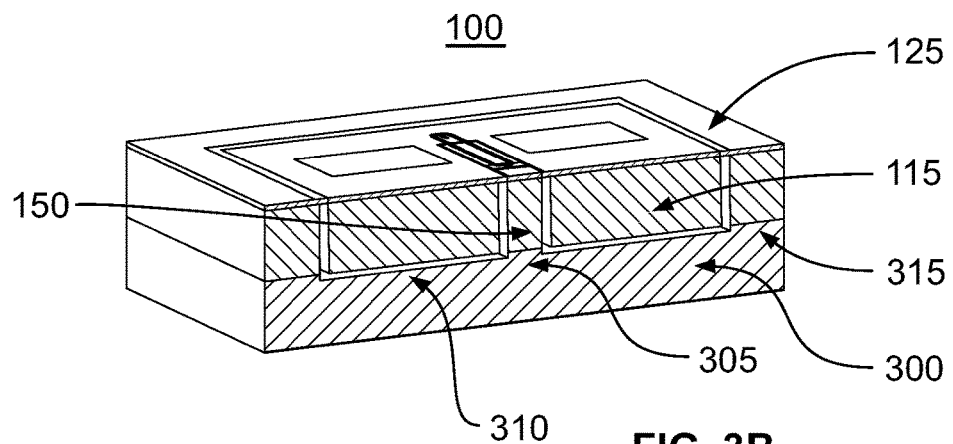
Figure 3C:
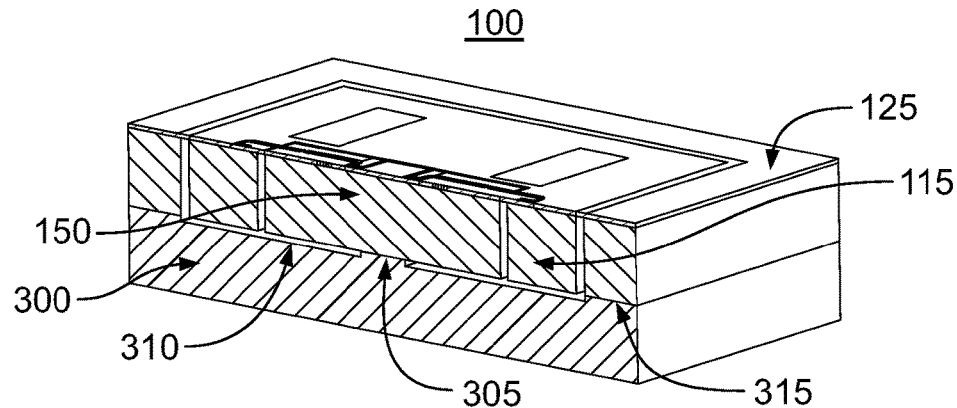

In other embodiments, the back-side central anchor point 150 may be planar with the rest of the proof mass 115, as illustrated in FIGS. 3A-3C. These embodiments employ a stator plate 300 with a stator central mesa 305 surrounded by an etched trench 310, surrounded by a stator frame 315. The stator central mesa 305 is bonded to the back-side central anchor point 150 during fabrication. Due to the etched trench 310, the proof mass 115 is not restrained and may move in response to an externally applied acceleration. The stator frame 315 is bonded to the frame 125 during fabrication.

Figure 4:
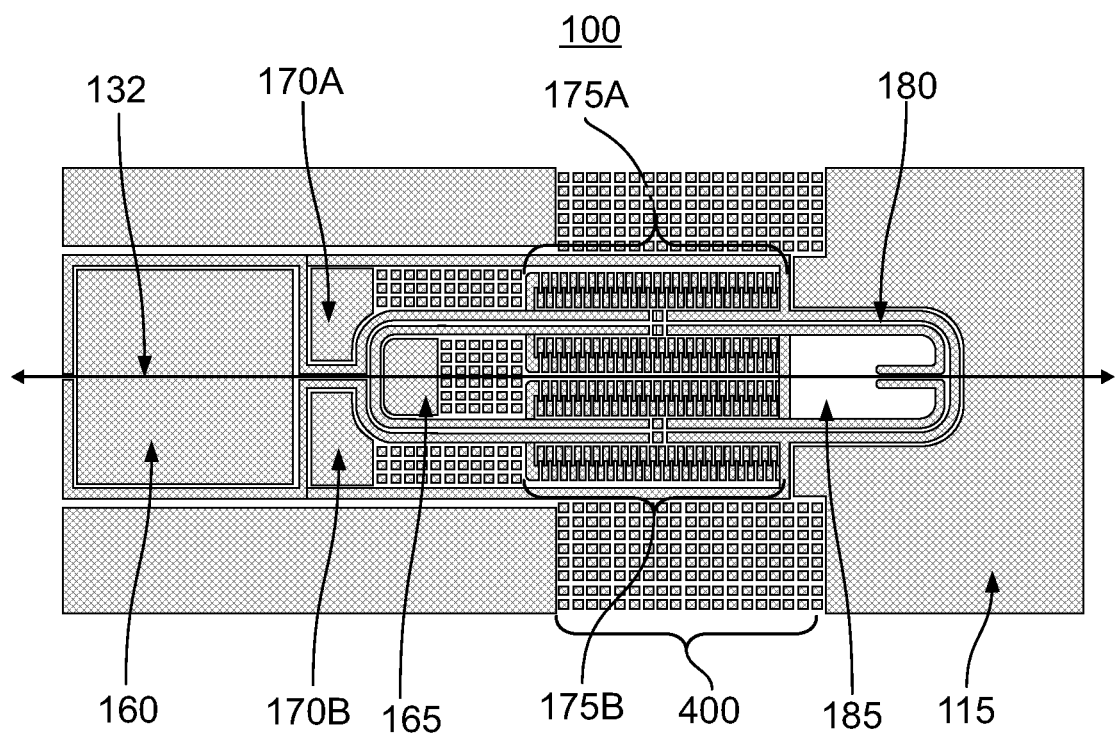
FIG. 4 is a detailed illustration of the top surface of the micro-electro-mechanical system portion of a resonant beam accelerometer in accordance with one or more embodiments of the present invention.
Figure 5A:
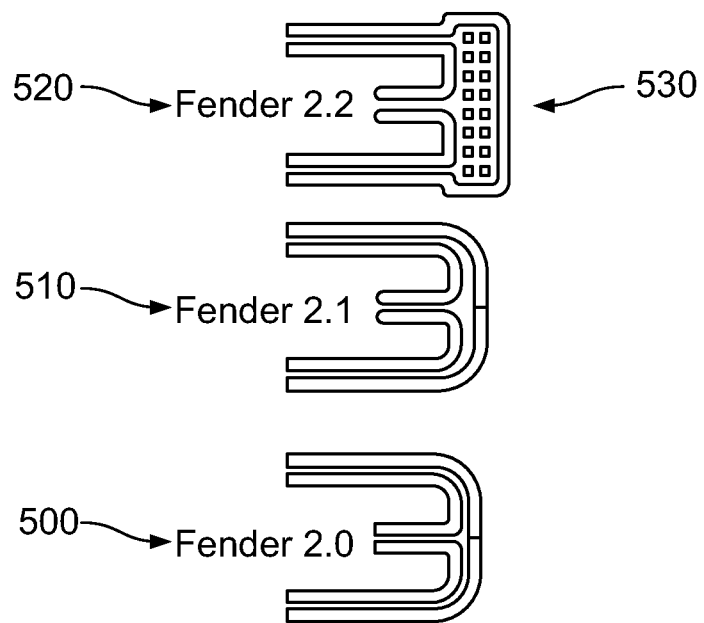
FIG. 5A illustrates three different double ended tuning fork configurations that may be employed in a resonant beam accelerometer in accordance with one or more embodiments of the present invention, while FIG. 5B illustrated the modeled response of the three different double ended tuning fork configurations.
Figure 5B:
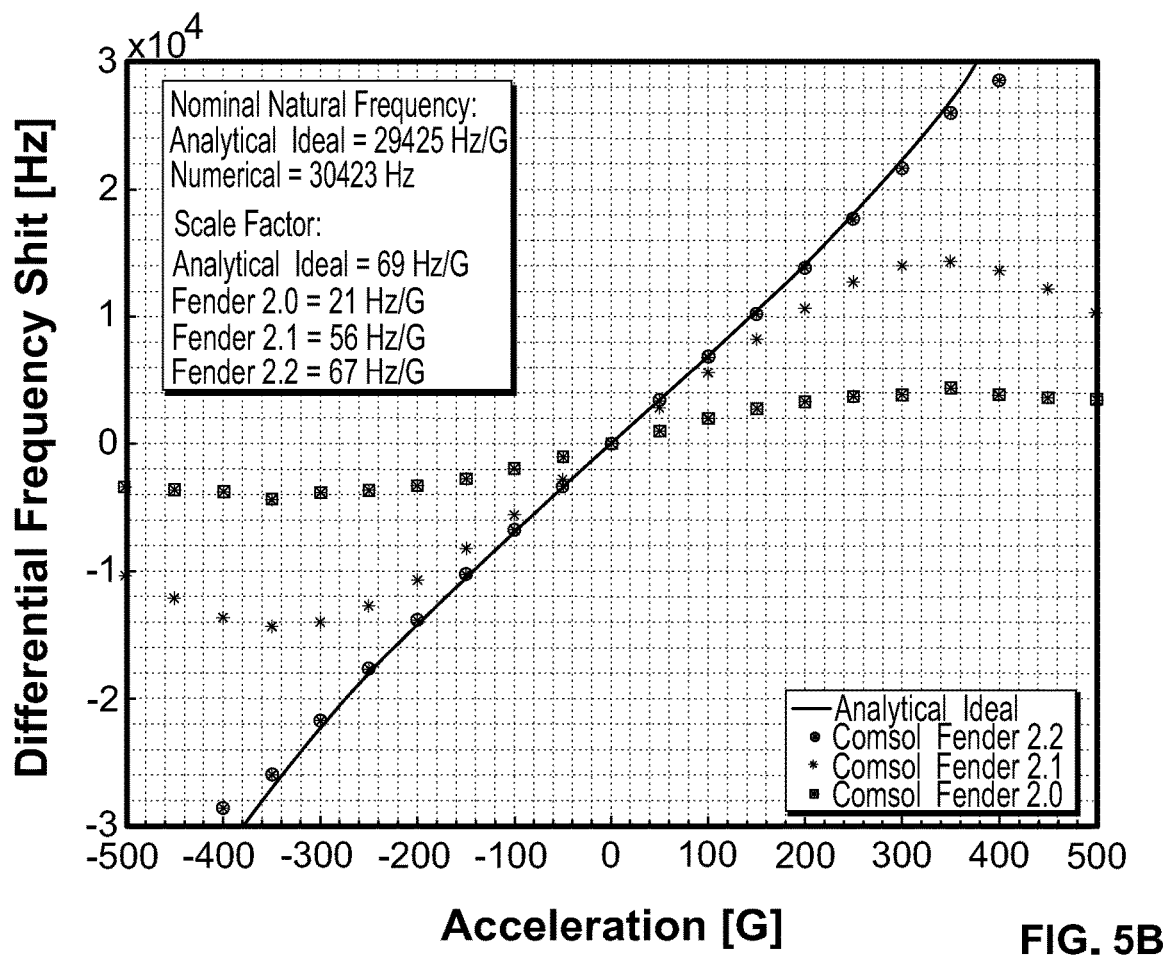

FIG. 4 illustrates a portion of the top surface of the MEMS portion of the RBA 100, which would be mirrored in the overall MEMS portion of the RBA 100. Directly above the back-side central anchor point 150, but on the top side of the handle 105, is a front-side central anchor point 160 for the resonant beam structures 130A, 130B and various electrodes. The various electrodes include a drive electrode bond pad 165 and a pair of sense electrode bond pads 170A, 170B in electrical contact with a corresponding pair of sense electrodes 175A, 175B. As illustrated in FIG. 4, each of the resonant beam structures 130A, 130B is implemented as a double ended tuning fork 180. The central anchor point 160 includes a metal bond pad that serves as an electrode for receiving the bias voltage applied to the double ended tuning fork 180. The double ended tuning fork 180 is coupled to the proof mass 115 at a proof mass anchor point 185. While the illustrated RBA 100 employs a double ended tuning fork 180, other embodiments may employ alternative resonant beam structures. See, C. Comi et al., "A new two-beam differential resonant micro accelerometer," IEEE Sensors Conference, pp. 158-163 (2009), the contents of which are incorporated herein by reference, for a description of an alternative resonant beam structure. Modeled devices employing the double ended tuning fork 180 illustrated in FIG. 4 produced limited differential frequency shift. To improve this differential frequency shift performance, double ended tuning forks with coupling blocks having alternative configurations were modeled. Double ended tuning forks having the original coupling block configuration 500 (identified as Fender 2.0) and two alternative coupling block configurations 510, 520 (identified as Fender 2.1 and Fender 2.2, respectively) are illustrated in FIG. 5A. As illustrated in FIG. 5B, modeling showed that the alternative coupling block configuration 520 (Fender 2.2), having a strengthened (due to increased thickness) but perforated coupling block 530, produced the greatest differential frequency shift. Note that the perforations in the coupling block 530 were added to simplify the fabrication process.

The front-side central anchor point 160 and the back-side central anchor point 150 define opposite ends of a central anchor column. The proof mass 115 thus has a "donut" shape, with the central anchor column in the central hole of the donut, i.e., the proof mass 115 is located around the central anchor column. The proof mass 115 moves laterally with respect to the central anchor column in a direction parallel to the double ended tuning fork 180 when subjected to an externally applied acceleration that is also in a direction parallel to the double ended tuning fork 180, i.e., parallel to the acceleration measurement axis 132. This lateral motion of the proof mass 115 is enabled by the proof mass flexures 135A-135D, each of which is mechanically coupled between the central anchor column and the proof mass 115. The double ended tuning fork 180 senses this motion of the proof mass 115 as the double ended tuning fork 180 is likewise mechanically coupled between the central anchor column and the proof mass 115.

The drive electrode 165, the pair of sense electrodes 170A, 170B, and the double ended tuning fork 180 are mechanically coupled to the handle 105 by a buried oxide built into the SOI wafer, as will be described below with reference to FIG. 6. The drive electrode 165 and the pair of sense electrodes 170A, 170B have corresponding bondable metal layers on top of them for signal I/O. By vertically aligning the back-side central anchor point 150 and the front-side central anchor point 160 for the various elements, the relative thermal expansions between them should be minimized, further reducing the sensor thermal coefficients.

The resonant beam structures 130A, 130B, implemented as double ended tuning forks 180, are defined in the device layer 110 with UV lithography, as will be described below with reference to FIG. 6, in a differential architecture. This is achieved by strapping the resonant beam structures 130A, 130B from the front-side central anchor point 160 to opposite ends of the proof mass 115 defined in the handle 105. With this design of the MEMS portion of the RBA 100, the sets of the double ended tuning forks 180 will receive a large loading force for a given externally applied acceleration due to the large proof mass 115 built into the handle 105. This allows the sets of the double ended tuning forks 180 to be stiffer and have a larger cross-sectional width while still maintaining a reasonable scale factor of frequency shift per g of acceleration. A set of the double ended tuning forks 180 having a larger cross-sectional width will reduce temperature stress effects, produce a high resonant frequency for a good in-run bias stability, and increase robustness to mechanical vibration and shock. Additionally, fabrication tolerances and variability will have a smaller relative effect on target parameters such as the nominal resonant frequency of the set of the double ended tuning forks 180. This is important since there is a drift term that is a function of this nominal frequency mismatch.

Figure 6A:
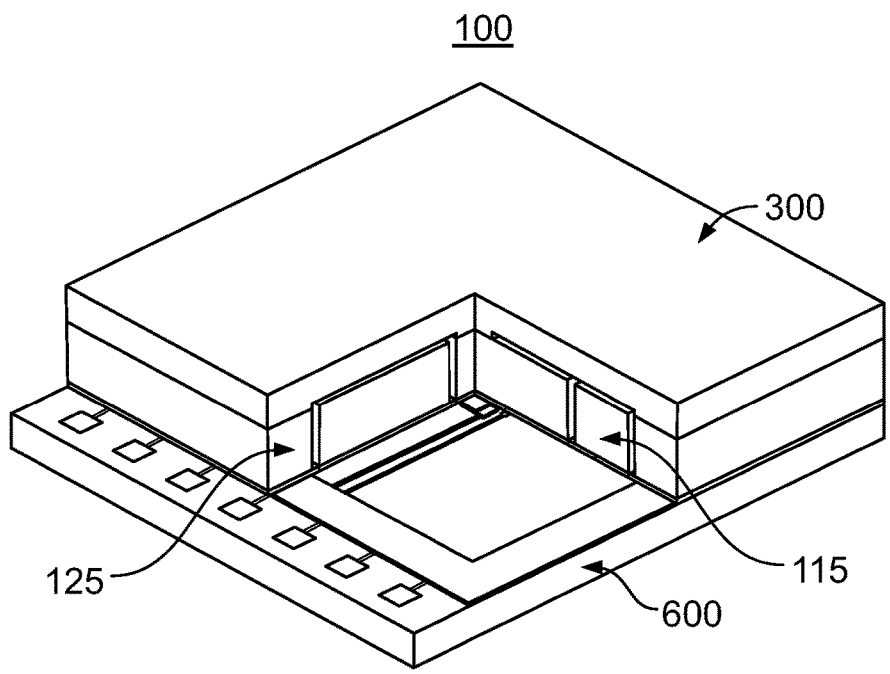
FIGS. 6A and 6B illustrate bottom three-dimensional views of a lid for a resonant beam accelerometer in accordance with one or more embodiments of the present invention.
Figure 6B:
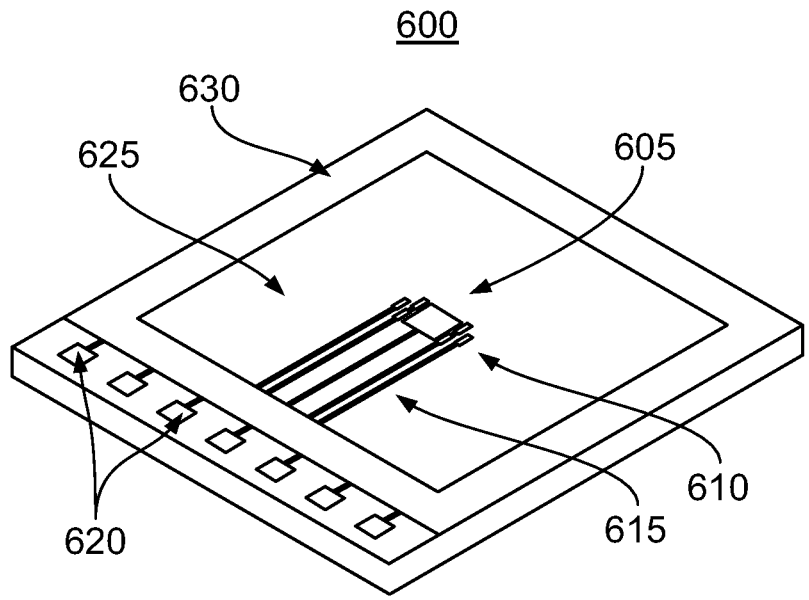

In certain embodiments, the RBA 100 may include a lid 600, as illustrated in FIGS. 6A and 6B. The lid 600 includes a cap central mesa 605 with a set of contacts 610 that will be in electrical contact with the bond pad of central anchor point 160, the drive electrode bond pad 165, and the pair of sense electrode bond pads 170A, 170B. A set of corresponding traces 615 and set of corresponding bond pads 620 permit application of drive signals and access to sense signals when the RBA 100 is encapsulated by the stator plate 300 and the lid 600. The lid 600 optionally includes an etched trench 625, surrounded by a lid frame 630. Due to the thickness of the bond pads 620 and/or the optional etched trench 625, the double ended tuning forks 180 are not restrained and may move in response to an applied drive voltage. The cap frame 630 is bonded to the frame 125 during fabrication. While use of the stator plate 300 and the lid 600 ensures foreign particles do not interfere with operation of the RBA 100, the stator plate 300 and the lid 600 also permit the RBA 100 to be vacuum sealed, thereby enhancing operating and sensitivity of the RBA 100.

Exemplary Fabrication Flow

Figure 7A:
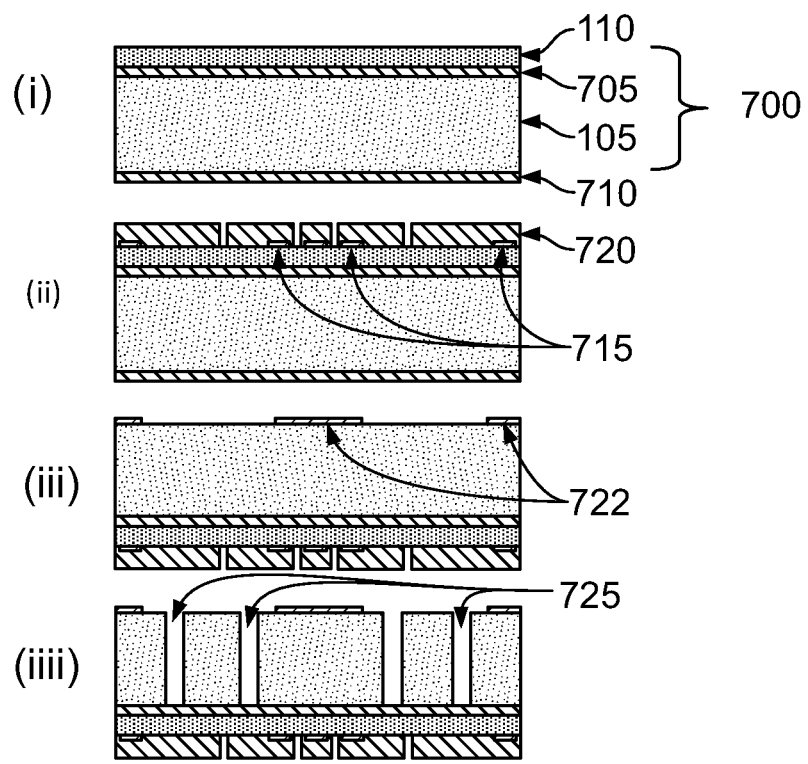
FIGS. 7A-7C illustrate a fabrication flow for a resonant beam accelerometer in accordance with one or more embodiments of the present invention.
Figure 7B:
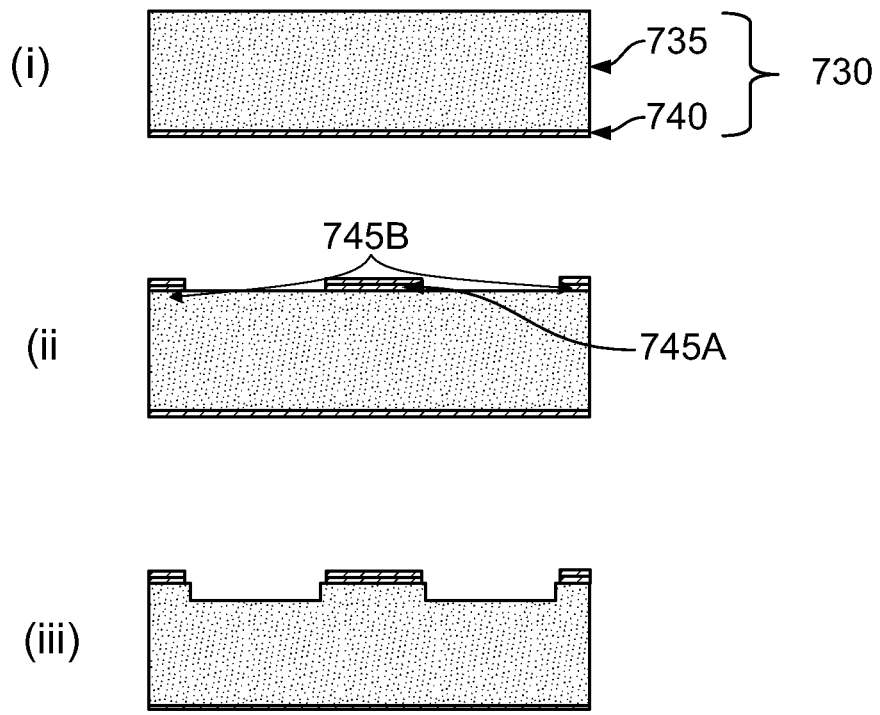
Figure 7C:
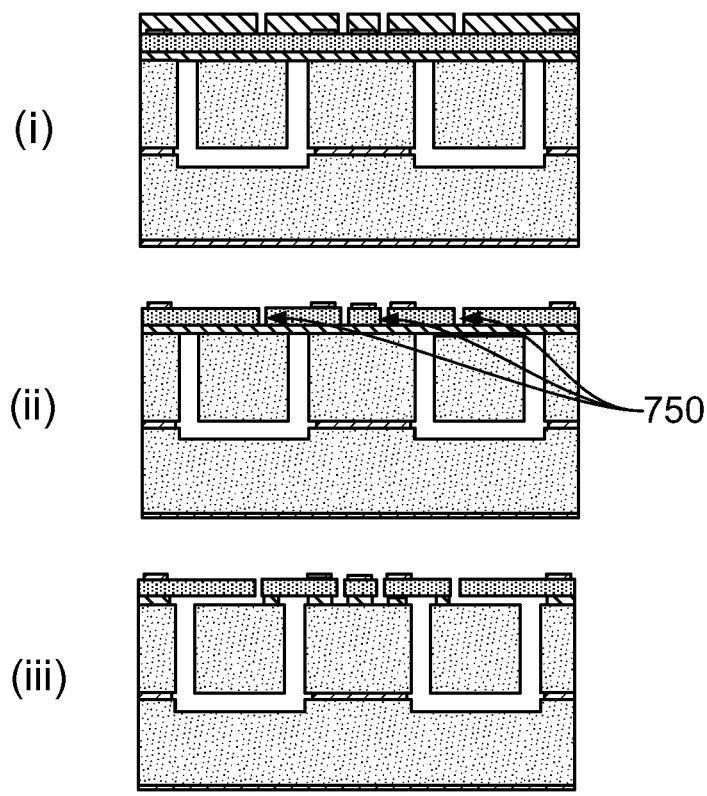

FIGS. 7A-7C illustrate a fabrication flow for an RBA. FIG. 7A illustrates the portion of the process flow used to fabricate the MEMS portion of the RBA 100. The starting RBA substrate 700 includes the handle 105, the device layer 110, a buried oxide layer 705 between the handle 105 and the device layer 110, e.g., a traditional SOI wafer, and a back-side oxide layer 710, as illustrated in FIG. 7A (i). In a first step, contacts 715 are formed on the device layer 110, as illustrated in FIG. 7A (ii). The contacts 715 include the bondable top metal layer 140, the central anchor point bond pad 160, the drive electrode bond pad 165, and the pair of sense electrode bond pads 170A, 170B. A second front-side oxide layer 720 is formed and patterned as part of the first step. In step two, illustrated in FIG. 7A (iii), the back-side oxide layer 710 is removed and a back-side metal layer 722 is deposited and patterned. In step three, illustrated in FIG. 7A (iv), patterned photoresist is used as an etch mask and a series of trenches 725 is etched through the handle 105 to the buried oxide layer 705. These trenches 725 include the trench 120 that separates the proof mass 115 from the frame 125 and a series of trenches that define the proof mass flexures 135A-135D. The patterned photoresist is removed after the trenches 725 are etched. In certain embodiments of the present invention, polysilicon vias (not illustrated) may be employed to connect portions of the device layer 110 to the handle 105 for grounding sections of the handle 105. These polysilicon vias reduce the electrical coupling between the two sets of drive/sense electrodes 165, 170A, 170B.

FIG. 7B illustrates the portion of the process flow used to fabricate the stator plate 300. The starting stator substrate 730 includes a stator handle 735 and a stator back-side contact layer 740, as illustrated in FIG. 7B (i). In a first step, contacts 745, including a eutectic layer, are formed, as illustrated in FIG. 7B (ii). These contacts 745 include a central island contact 745A and a stator frame contact 745B. FIG. 7B (iii) illustrates the results of a second step, in which the trench 310 is etched, thereby creating the stator central mesa 305 and the stator frame 315.

FIG. 7C illustrates the portion of the process flow that bonds the MEMS portion of the RBA 100 to the stator plate 300 and then releases the proof mass 115 from the device layer 110. In a first step, the frame 125 is bonded to the stator frame 315 and the back-side central anchor point 150 is bonded to the stator central mesa 305 using the eutectic layer formed on the central island contact 745A and the stator frame contact 745B, respectively, as illustrated in FIG. 7C (i). In step two, illustrated in FIG. 7C (ii), the patterned second front-side oxide layer 720 is used as an etch mask and a series of trenches 750 are etched through the device layer 110 to the buried oxide layer 705. These trenches 750 define the pair of resonant beam structures 130A, 130B. FIG. 7C (iii) illustrates the results of a third step, in which portions of the buried oxide layer 705 are removed by etching, thereby releasing the proof mass 115 from the device layer 110. This etching/release step is facilitated by a series of holes 400 formed in the device layer 110 over the corresponding portions of the buried oxide layer 705 that are removed by etching. These series of holes 400 are illustrated in FIG. 4.

The MEMS portion of the RBA 100 and its individual elements may be formed of any suitable material, have any suitable dimensions, and formed in any suitable manner. For example, the overall RBA device may be from approximately 3 to 30 mm on a side, with the proof mass 115 having a length of approximately 2 to 25 mm on a side. The handle 105 may be formed of silicon and have a thickness, for example, from approximately 500 µm to 1 mm, while the device layer 110 may also be formed of silicon, but have a thickness, for example, from approximately 10 to 100 µm. The buried oxide layer 705, the back-side oxide layer 710, and the second front-side oxide layer 720 may be formed of silicon dioxide, and each have thicknesses, for example, from approximately 1 to 3 µm. The frame 125 may have a width, for example, from approximately 100 µm to 1 mm. The width of the arms of the double ended tuning forks 180 may, for example, be from approximately 1 to 30 µm, while the length of the arms of the double ended tuning forks 180 may, for example, be from approximately 400 µm to 4 mm. The width and length of the individual flexure arms of the four proof mass flexures 135A-135D may, for example, be from approximately 15 to 200 µm and from approximately 500 µm to 6 mm, respectively, though certain embodiments of the present invention may employ even narrower flexure arms for increased sensitivity.

As will be appreciated by one of skill in the art, wider arms for the double ended tuning forks 180 will require higher drive voltages and/or a higher vacuum in the packaging of the RBA device. As will also be appreciated by one of skill in the art, if the arms of the double ended tuning forks 180 become too long, their out of plane stiffness will decrease to the point that performance and reliability suffers. This out of plane stiffness may be increased by employing a thicker device layer 110 and/or wider arms for the double ended tuning forks 180. In summary, the dimensions of various individual elements are interrelated and will be subject to traditional engineering tradeoffs to meet specific performance requirements.

The stator plate 300 and its individual elements may be formed of any suitable material, have any suitable dimensions, and formed in any suitable manner. For example, the stator handle 735 may be formed of silicon and have a thickness, for example, from 500 to 650 µm.

The various contacts and bond pads, including the bondable top metal layer 140, the front-side central anchor point bond pad 160, the drive electrode bond pad 165, the pair of sense electrode bond pads 170A, 170B, the back-side contact layer 740, the central island contact 745A, and the stator frame contact 745B, may be formed, for example, of aluminum or an aluminum copper alloy. The eutectic layer may be formed, for example, of germanium, which, when heated during the bonding step illustrated in FIG. 7C (i), will form an aluminum germanium eutectic bond.

Operation

The RBA may, for example, be operated as follows. A driving voltage in the form of a square wave is applied to the drive electrode to actuate the double ended tuning fork, though other waveforms may be employed, for example, a sine wave. The driving voltage simultaneously draws each arm of the double ended tuning fork toward the center and then releases the arms, thereby causing the double ended tuning forks to vibrate in a direction perpendicular to the acceleration measurement axis and in the plane of the device layer. As illustrated in FIG. 4, the driving voltage may, for example, be used to operate a pair of comb drivers, though other driver types may be employed. The arms of the double ended tuning forks thus vibrate in antiphase at the resonant frequency. Each of the pair of double ended tuning forks will be driven by its own respective driving voltage. The driving voltage has a peak-to-peak voltage of between 1 and 20 $V_{pp}$, with a greater driving voltage required for stiffer or larger devices, or when the RBA is not operating under moderate vacuum conditions.

Acceleration parallel to the acceleration measurement axis is measured by sensing the temporal change in capacitance of the sense electrodes. As illustrated in FIG. 4, the sense electrodes may take the form of a pair of comb sensors, though other sensor types may be employed. Changes in the capacitance of the sense electrodes form the basis of the sensed acceleration. A change in capacitance occurs via a change in overlap of the sense electrodes due to the arms of the double ended tuning fork being drawn to the center and then released by the driving voltage. Thus, the driving voltage induces a corresponding change in the magnitude of the capacitance. When the RBA is not subject to an acceleration parallel to the acceleration measurement axis, the frequency of this change in capacitance is at a fixed resonant frequency with the motion sustained by the driving voltage. When subject to an acceleration parallel to the acceleration measurement axis, the double ended tuning forks will experience an axial loading. This change in tension/compression will cause a change in the resonant frequency of the double ended tuning fork, and thus the frequency of the change in capacitance will likewise change. By sensing this change in the frequency of the change in capacitance, one can determine the acceleration. A DC bias between 3 and 30 $V_{DC}$ is applied to the bond pad associated with the central anchor point. The bias current through the sense electrode bond pads will change as the RBA-based sensor, via the sense electrodes, attempts to keep a constant voltage difference across the changing capacitance of the sense electrodes. These changes in the bias current are measured, for example, by a charge amplifier or a transimpedance amplifier.

Figure 8:
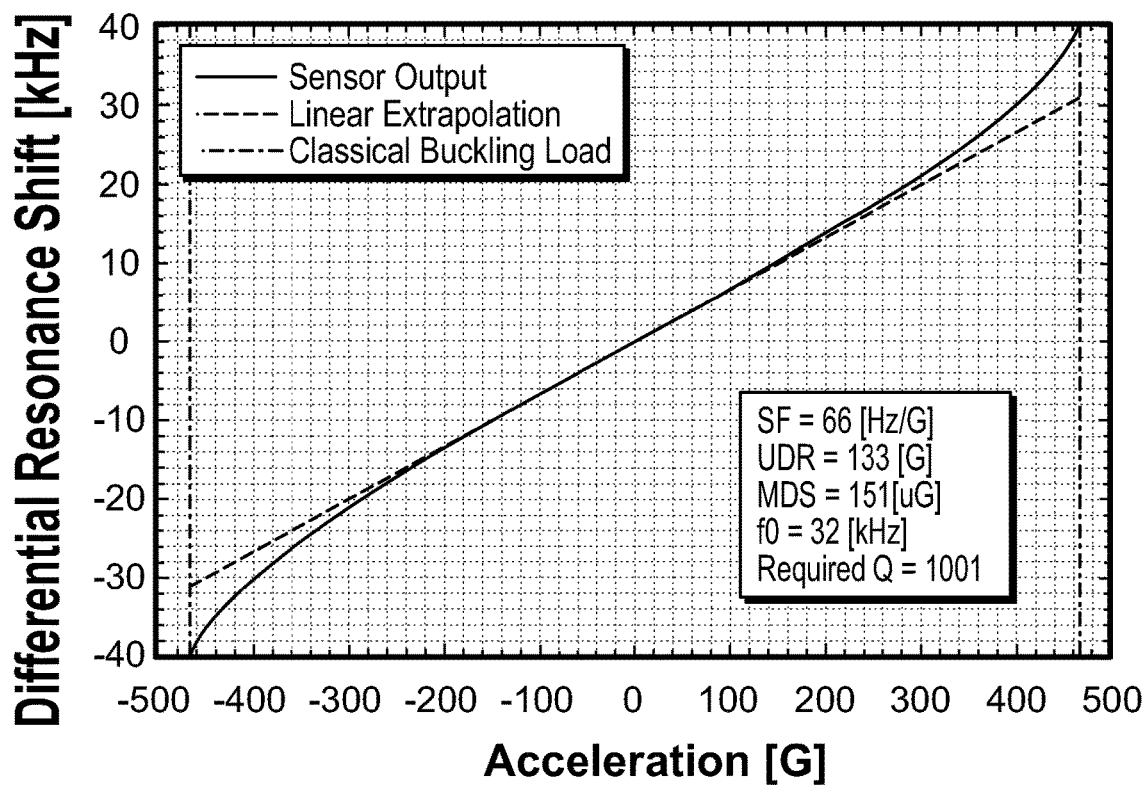
FIG. 8 illustrates the modeled differential resonance shift as a function of applied acceleration for a resonant beam accelerometer in accordance with one or more embodiments of the present invention.

The pair of double ended tuning forks will each resonate at their own respective resonant frequencies, thus the need for two corresponding driving voltage waveforms. These resonant frequencies may, for example, be in the range of approximately 1 kHz to 100 kHz. In the configuration illustrated in FIG. 1, when an externally applied acceleration forces the proof mass in a direction parallel to the acceleration measurement axis, one double ended tuning fork will experience a tensile loading while the other double ended tuning fork will receive a compressive loading. The double ended tuning fork experiencing tensile loading will have a positive shift in resonant frequency (higher frequency) while the double ended tuning fork experiencing compressive loading will have a negative shift in resonant frequency (lower frequency). By reading out the difference in shifted resonant frequencies the linear range of the RBA device is widened, which would otherwise have a square root relationship with acceleration. FIG. 8 illustrates the modeled shift in differential resonance as a function of an externally applied acceleration for a modeled RBA device having a double ended tuning fork configuration similar to the double ended tuning fork configuration 520. Additionally, a differential RBA device can cancel many drift terms that are common to both double ended tuning forks, including thermal and electronic drift.

Figure 9:
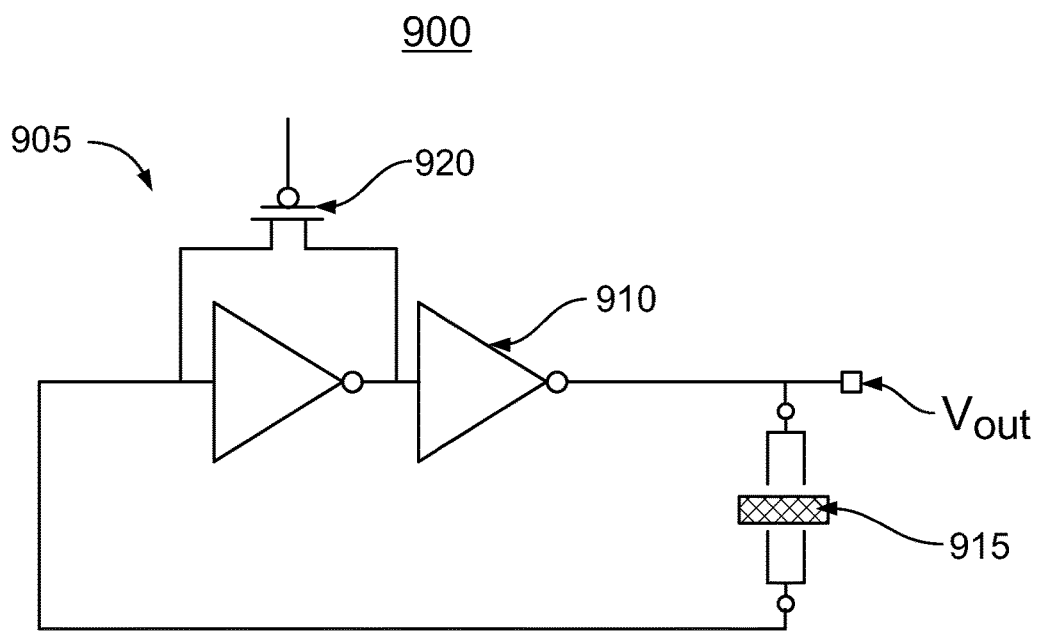
FIG. 9 illustrates a first readout circuit that may be employed with a resonant beam accelerometer in accordance with one or more embodiments of the present invention.

FIG. 9 illustrates a readout circuit 900 that may be employed with an RBA device. The illustrated readout circuit 900 is one of two channels required, with one channel required for each of the pair of double ended tuning forks in the RBA. The readout circuit 900 performs two functions: driving the RBA and generating a readout signal indicative of the measured acceleration. The readout circuit 900 includes a variable gain transimpedance amplifier 905 and an inverting amplifier 910 coupled to a double ended tuning fork 915. The combination of the variable gain transimpedance amplifier 905, the inverting amplifier 910, and the double ended tuning fork 915 forms an oscillation loop, which generates an output waveform at the resonant frequency of the double ended tuning fork 915. The gain of the variable gain transimpedance amplifier 905 can be varied by varying the impedance of a feedback transistor 920 to ensure that the double ended tuning fork 915 remains in its linear vibration range. By measuring the difference in the resonant frequencies of the pair of double ended tuning forks 915, one can determine the acceleration applied to the RBA.

Figure 10:
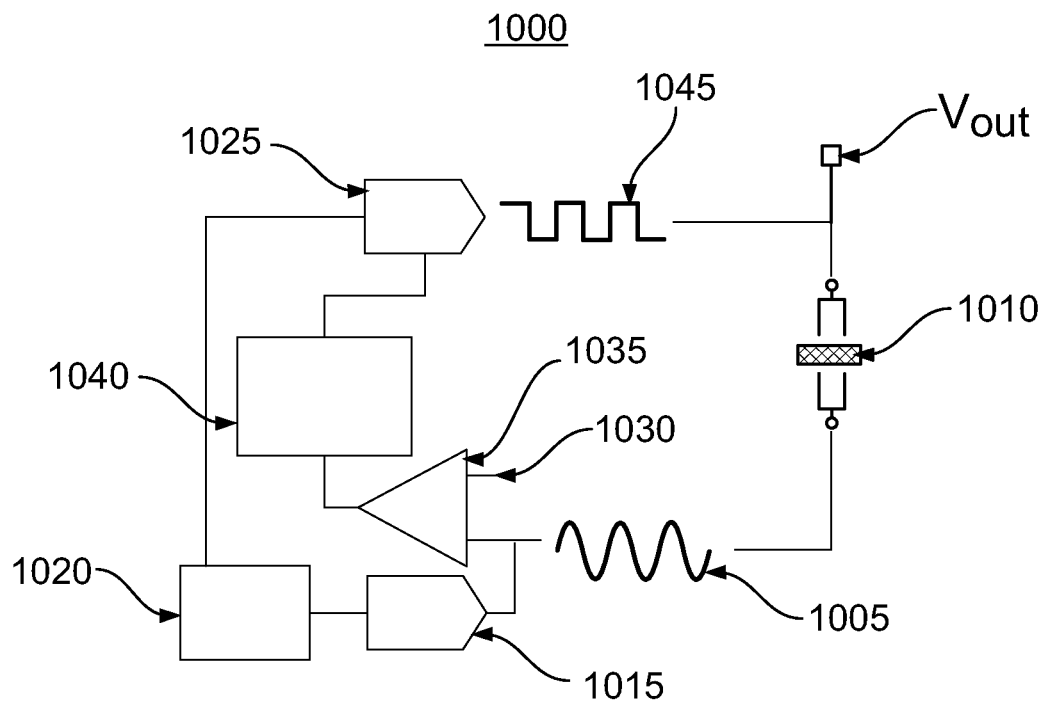
FIG. 10 illustrates a second readout circuit that may be employed with a resonant beam accelerometer in accordance with one or more embodiments of the present invention.

FIG. 10 illustrates an alternative readout circuit 1000 that may be employed with an RBA device. The illustrated readout circuit 1000 is one of two channels required, with one channel required for each of the pair of double ended tuning forks in the RBA. The readout circuit 1000, which is a phase lock loop and amplitude gain control system, employs a combination of an analog-to-digital converter (ADC) 1015, a digital-to-analog converter (DAC) 1025, a comparator 1035, a timer block 1040, and signal processing. Specifically, a drive waveform 1045 is generated at an initial frequency and amplitude by the DAC 1025. The drive waveform 1045 excites the double ended tuning forks 1010, producing a mechanical response at the drive frequency with a relative phase difference of between 0 and 180 degrees. The displacement of the double ended tuning forks 1010 is read out by a charge amplifier circuit (not illustrated) to produce a sinusoidal response waveform 1005. The response waveform 1005 is then split. A first copy of the response waveform 1005 is sent to the comparator 1035 where it is converted to a square wave by outputting an upper voltage when the response waveform 1005 is greater than a threshold level 1030, and a lower voltage when the response waveform 1005 is less than the threshold level 1030. The square wave produced by the comparator 1035 reflects the relative phase information between the drive waveform 1045 and the response waveform 1005 and is fed to a timer block 1040. The timer block 1040 attempts to force the relative phase value to 90°, which is the resonance phase response of a second order system. It achieves this by adjusting the frequency of the drive waveform 1045 until the response waveform 1005 is in phase with an internally generated waveform that is 90° lagging the drive waveform 1045. Once achieved, the double ended tuning forks 1010 are phase locked at resonance. The second copy of response waveform 1005 is sent to the ADC 1015, where the response waveform 1005 is digitized, and the amplitude of the response waveform 1005 is extracted. If the amplitude is too large and in jeopardy of entering the nonlinear region of the double ended tuning forks 1010, the amplitude of the drive waveform 1045 is reduced through the DAC 1025. Through these parallel control loops (frequency/phase and amplitude), the double ended tuning forks 1010 resonate in a linear vibration range such that the difference in drive frequencies between the two independent double ended tuning fork control loops can be converted to an acceleration output. The readout circuit 1000 may, for example, be implemented with a microcontroller as many microcontrollers include comparators, ADCs, DACs, and timers. Alternatively, individual integrated circuits may be employed to implement the desired functionality.

Device Characterization

Figure 11:
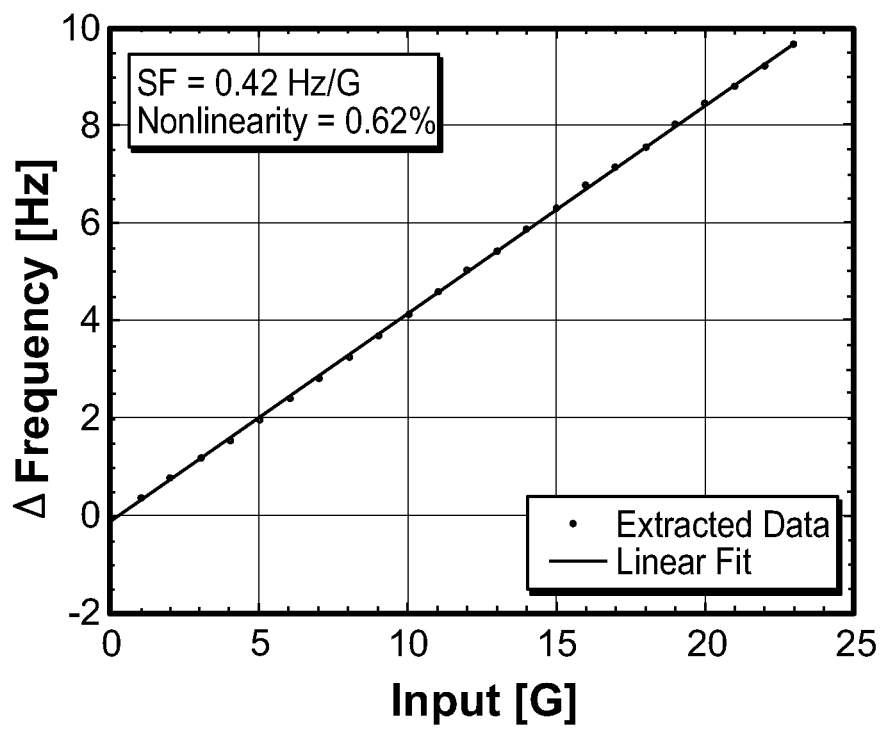
FIG. 11 illustrates the linearity and sensitivity factor SF of a single double ended tuning fork that may be employed as part of a resonant beam accelerometer in accordance with one or more embodiments of the present invention.

Single double ended tuning fork devices having the original double ended tuning fork configuration 500 were fabricated and characterized, i.e., only one of the double ended tuning fork devices was operated at a time, producing single-ended results as opposed to differential results. In a first test, the devices were subjected to increasing forces up to 23 G, with the results illustrated in FIG. 11. As shown in FIG. 11, the devices proved to be linear over the entire range, with a nonlinearity of 0.62% and a sensitivity factor SF of 0.42 Hz/G, i.e., the resonant frequency changed by 0.42 Hz per applied G of force. The large discrepancy in sensitivity factors SF between FIGS. 8 and 11 is due to the much wider flexures, 80 µm versus 20 µm, in the measured versus modeled devices, respectively. Subsequently fabricated and characterized devices having 20 µm wide flexures produced sensitivity factors SF matching those predicted in FIG. 8.

The frequency response of the single double ended tuning fork devices was tested between 10 Hz and 300 Hz when subjected to a 1 G force. As illustrated in FIG. 12, the sensitivity factor SF rolled off as expected, with a 10% decrease in the sensitivity factor SF observed at just over 100 Hz. FIGS. 13A and 13B illustrate the linearity and nonlinearity as a percent, respectively, at a frequency of 30 Hz when subjected to forces between 0.5 and 5 G.

Figure 14A:
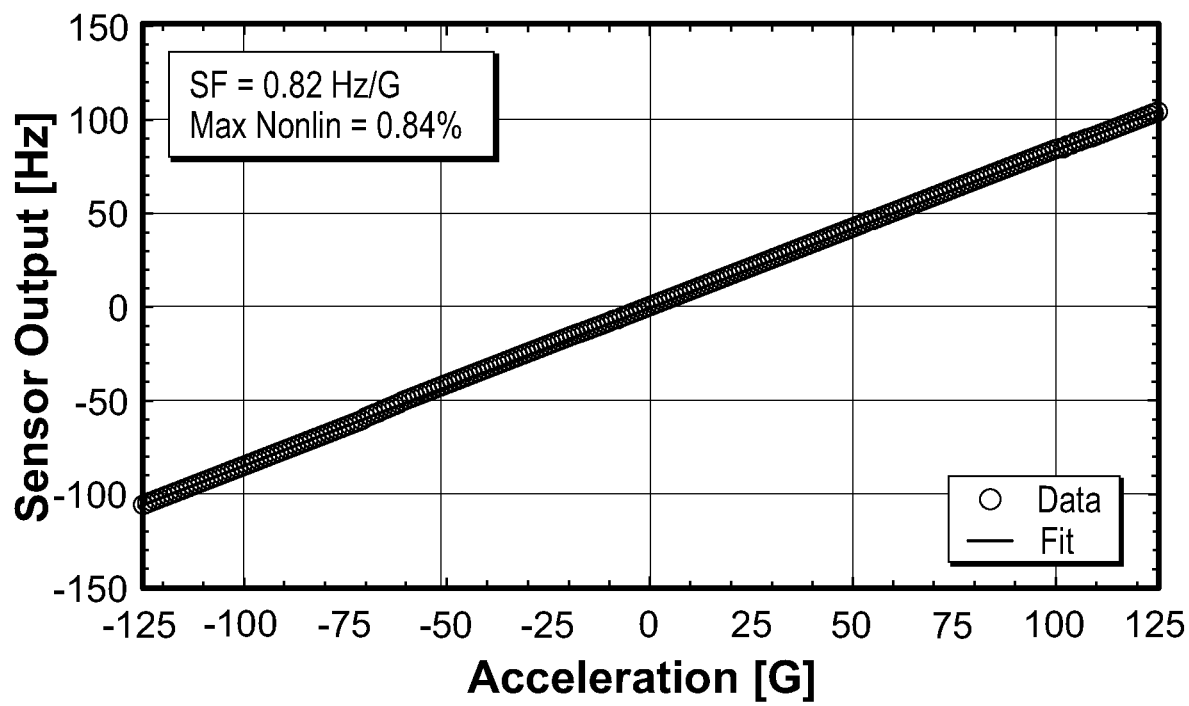
FIGS. 14A and 14B illustrate the linearity and nonlinearity as a percent, respectively, of a differential resonant beam accelerometer in accordance with one or more embodiments of the present invention.
Figure 14B:
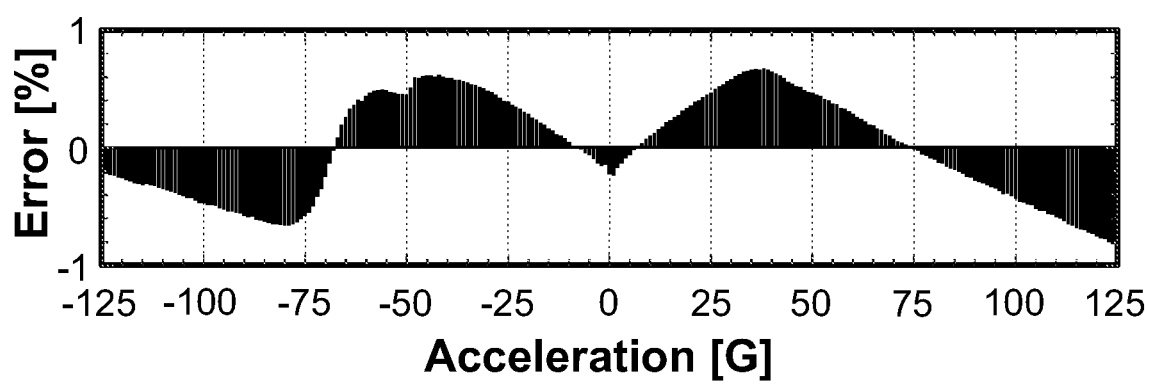

Resonant beam accelerometers with a single double ended tuning fork having the original double ended tuning fork configuration 500 were likewise fabricated and characterized. As illustrated in FIG. 14A, multiple testing runs, when combined using differential mode post processing, revealed that these resonant beam accelerometers had a sensitivity factor SF of 0.84 Hz/G, approximately twice that of their single double ended tuning fork device counterparts. This doubling of the sensitivity factor SF would be expected when the resonant beam accelerometers are operated in differential mode. Note that the resonant beam accelerometers, as illustrated in FIG. 14A, were subjected to both positive and negative forces up to 125 G in magnitude. FIG. 14B illustrates the corresponding nonlinearity over this ±125 G range of forces, with the maximum nonlinearity being 0.84%.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A resonant beam accelerometer comprising:
 a central anchor column, the central anchor column formed of a handle layer and a device layer;
 a proof mass, the proof mass formed of the handle layer, the proof mass located around the central anchor column;
 first and second resonant beam structures, the first and second resonant beam structures formed of the device layer, the first and second resonant beam structures located along an acceleration measurement axis, the acceleration measurement axis perpendicular to the central anchor column, the first and second resonant beam structures mechanically coupled between the central axis column and the proof mass, each of the first and second resonant beam structures adapted to resonate at respective first and second resonant frequencies, the first and second resonant frequencies being a function of an externally applied acceleration in a direction parallel to the acceleration measurement axis;
 a plurality of proof mass flexures, the plurality of proof mass flexures formed of the handle layer, each of the plurality of proof mass flexures mechanically coupled between the central axis column and the proof mass, the plurality of proof mass flexures adapted to permit motion of the proof mass along the acceleration measurement axis with respect to the central anchor column;
 first and second drivers, the first and second drivers formed of the device layer, the first and second drivers adapted to cause respective ones of the first and second resonant beam structures to resonate at respective first and second resonant frequencies; and
 first and second sensors, the first and second sensors formed of the device layer, the first and second sensors adapted to sense changes in respective first and second resonant frequencies.

2. The resonant beam accelerometer of claim 1,
 wherein the handle layer includes silicon; and
 wherein the handle layer has a thickness between approximately 500 µm and 1 mm.

3. The resonant beam accelerometer of claim 1,
wherein the device layer includes silicon; and
wherein the device layer has a thickness between approximately 10 µm and 100 µm.

4. The resonant beam accelerometer of claim 1, wherein each side of the proof mass has a length between approximately 2 mm and 25 mm.

5. The resonant beam accelerometer of claim 1, wherein the first and second resonant beam structures include respective first and second double ended tuning forks, the first and second double ended tuning forks include respective first and second pairs of arms.

6. The resonant beam accelerometer of claim 5,
wherein a width of each of the first and second pairs of arms is between approximately 1 µm and 30 µm; and
wherein a length of each of the first and second pairs of arms is between approximately 400 µm and 4 mm.

7. The resonant beam accelerometer of claim 1, wherein each of the first and second resonant frequencies is between approximately 1 kHz and 100 kHz.

8. The resonant beam accelerometer of claim 1, wherein each of the plurality of the proof mass flexures includes a respective plurality of flexure arms.

9. The resonant beam accelerometer of claim 8,
wherein a width of each of the plurality of flexure arms is between approximately 15 µm and 200 µm; and
wherein a length of each of the plurality flexure arms is between approximately 500 µm and 6 mm.

10. The resonant beam accelerometer of claim 1, wherein each of the first and second drivers includes a respective pair of comb drivers.

11. The resonant beam accelerometer of claim 1, wherein each of the first and second sensors includes a respective pair of comb sensors, each of the first and second sensors adapted to sense a respective frequency change in capacitance.

12. The resonant beam accelerometer of claim 1, further comprising a frame, the frame formed of the handle layer and the device layer, the frame located around a periphery of the proof mass.

13. The resonant beam accelerometer of claim 12, wherein the frame has a width between approximately 100 µm and 1 mm.

14. The resonant beam accelerometer of claim 12, further comprising a stator plate, the stator plate formed of a second handle layer, the stator plate including a stator central mesa and a stator frame, the stator central mesa bonded to a bottom point of the central anchor column, and the stator frame bonded to the frame.

15. The resonant beam accelerometer of claim 12, further comprising a lid, the lid formed of a third handle layer, the lid including a cap central mesa and a cap frame, the cap central mesa bonded to a top point of the central anchor column, and the cap frame bonded to the frame.

16. The resonant beam accelerometer of claim 15, wherein the lid further includes:
a plurality of contacts, each of the plurality of contacts in electrical contact with a corresponding one of the first and second drivers and the first and second sensors;
a plurality of traces, each of the plurality of traces in electrical contact with a corresponding one of the plurality of contacts; and
a plurality of bond pads, each of the plurality of bonds pads in electrical contact with a corresponding one of the plurality of traces.

17. The resonant beam accelerometer of claim 12, further comprising:
a stator plate, the stator plate formed of a second handle layer, the stator plate including a stator central mesa and a stator frame, the stator central mesa bonded to a bottom point of the central anchor column, and the stator frame bonded to the frame; and
a lid, the lid formed of a third handle layer, the lid including a cap central mesa and a cap frame, the cap central mesa bonded to a top point of the central anchor column, and the cap frame bonded to the frame.

* * * * *